United States Patent [19]

Rubino

[11] Patent Number: 4,992,121

[45] Date of Patent: Feb. 12, 1991

[54] ELECTROSTATIC CHARGING

[76] Inventor: Robert M. Rubino, 22 Saturn St., San Francisco, Calif. 94114

[21] Appl. No.: 459,731

[22] PCT Filed: Feb. 8, 1990

[86] PCT No.: PCT/US90/00729

§ 371 Date: Feb. 8, 1990

§ 102(e) Date: Feb. 8, 1990

Related U.S. Application Data

[63] Continuation-in-part of Ser. No. 309,598, Feb. 10, 1989.

[51] Int. Cl.$^5$ .................. B32B 7/06; B32B 31/12
[52] U.S. Cl. .................... 156/71; 428/904.4; 428/913.3; 40/594; 156/273.1
[58] Field of Search .............. 428/195, 220, 904.4, 428/913.3; 156/273.1, 71; 40/158.1, 594

[56] References Cited

U.S. PATENT DOCUMENTS

| 3,440,750 | 7/1966 | Toth et al. | 40/158.1 X |
| 4,225,369 | 9/1980 | Felchin | 156/71 |
| 4,275,112 | 6/1981 | Savage, Jr. | 428/310 |
| 4,652,239 | 3/1987 | Brimberg | 40/594 X |
| 4,741,119 | 5/1988 | Baryla | 40/594 |

FOREIGN PATENT DOCUMENTS 5911183 12/1982 Japan .................................. 40/594

Primary Examiner—George F. Lesmes
Assistant Examiner—Christopher Brown
Attorney, Agent, or Firm—Limbach, Limbach & Sutton

[57] ABSTRACT

A method of adhering a relatively heavy sheet or three-dimensional object to a support surface using an electrostatically chargeable intermediate sheet, including providing a sheet which is capable of carrying a charge sufficient to support at least three ounces per square foot of intermediate sheet surface for at least one month and charging the sheet using a contaminant free buffer material selected from the group consisting of wool, natural fiber, artificial fiber and chamois. A decorative hanging including such an intermediate sheet is also disclosed.

4 Claims, No Drawings

ELECTROSTATIC CHARGING

RELATED APPLICATIONS

This application is a continuation-in-part of my application number 07/309,598, filed Feb. 10, 1989, now abandoned.

BACKGROUND OF THE INVENTION

Businesses and consumers, especially teenagers, frequently desire to display images or messages for a period of time up to months in duration, to be replaced by another image or display. For example, retail stores may periodically display "sale" signs, and teenagers may display posters or pennants of rock stars, athletic heros, or movie stars. The usual means for adhering these images to walls or ceilings are: (1) pins or nails; (2) adhesive tape; or (3) glue, all of which leave more or less damage to the support surface once the image is removed. There is a need for a convenient means to adhere images or messages to support surfaces without damaging the surface.

Moreover, the usual means for binding displays to a wall grip at the periphery, not throughout the entire surface. As a result, after a period of time, displays held by tape or pins will sag or wrinkle. It is desirable to have the display bound to the support surface over the entire back surface of the display.

The principle of electrostatic adhesion is well known. When two dissimilar materials are placed in contact, potential is created between the two materials wherever they actually touch each other. When they are separated, one will have a positive charge and the other will have a negative charge in the area in which they were in contact. A charge may be placed on some materials by rubbing with a static inducing material, such as fur, brushes or fibrous rollers, thus increasing the amount of charge. One material acquires electrons and the other gives them up.

When a charged material is placed close to a wall or other support surface, it creates an equal and opposite charge on the wall under each of the charged areas on the charged material, setting up a mirror image on the wall of the charge that resides in the charged material, but of opposite polarity. Because the two charges are of opposite polarity, they attract each other and the charged material adheres to the wall.

Ordinary paper and plastic sheets may be charged by rubbing with a static inducing material, but the charge bleeds off and the weight of the display material is too great to be retained on a wall or ceiling without a charge-sustaining intermediate material.

The use of electrostatic forces for supporting displays is generally known in the art. Thus, U.S. Pat. No. 3,440,750 shows the adhesion of three dimensional characters to a board by static electricity. Japanese Patent No. 59-111183 discloses a sheet or pocket of a fluoropolymer bonded to an object by rubbing the sheet against the surface to which it is to be bonded.

U.S. Pat. No. 4,652,239 shows a space planning kit in which a horizontal paper substrate is printed with a grid over which vinyl pieces, representing furniture and the like, may be temporarily placed, secured by static electricity.

U.S. Pat. No. 4,741,119 shows a display board with a paper document sandwiched between a charged plastic backing board and a transparent plastic cover of a size larger than the paper document, so that the border of the cover adheres to the backing board along the perimeter.

U.S. Pat. No. 4,225,369 discloses a method of securing a paper sheet backed by or covered with a PVC sheet to a smooth base, including the step of securing the sheet to the base by electrostatically charging the base by rubbing with a rag or the like.

U.S. Pat. No. 4,275,112 discloses the use of an electrostatically chargeable intermediate sheet of doubly charged irradiated and cross-linked insulative plastic foam having a bulk density of about two pounds per cubic foot and a thickness of 1/16 to ½ inch. In this document it is taught that the surface of the sheet should be smooth, and that the sheet is to be charged by vigorous rubbing with a hair or wool pad, mounted and recharged.

While these patents generally teach electrostatic adhesion, the problem remains that only relatively light materials can be supported, for example, small photographs, light paper posters and the like. Further, thicker and stiffer foam backings seem to have been used, apparently to provide improved support. This is also disadvantageous, since thinner backings are less obvious in use.

It is thus an object of the present invention to provide an article of manufacture which has improved electrostatic adhesive powers, as well as an improved method for electrostatically adhering objects to a support surface for an extended period of time, which article and method nevertheless use thinner backings than those of the prior art.

SUMMARY OF THE INVENTION

My earlier patent application discloses the rubbing of both natural and synthetic fibers against an electrostatically chargeable sheet to develop an electrostatic charge. I have now found, however, that the use of certain wool or artificial fiber pads or rollers to impart an electrostatic charge to the intermediate sheet provides holding strengths which are much improved, even where very thin intermediate sheets are used.

Thus, my invention is an improved method of adhering an electrostatically chargeable flexible intermediate polymeric sheet 1/16 of an inch or less in thickness to the back of the object, inducing an electrostatic charge on the sheet by rubbing it with a buffing material selected from the group consisting of substantially oil and fat free hair, fur or hide to impart a charge sufficient to support at least three ounces per square foot of chargeable sheet for at least one month without sliding or falling, and pressing the display and intermediate sheet against the support surface.

In a preferred embodiment, the method further includes the steps of applying an intermediate sheet of 1/32nd to 1/64th inch thickness to the back of said object.

In yet another embodiment it is preferred that the intermediate sheet be buffed using an oil free chamois.

The invention further includes an article of manufacture comprising an object secured to a sheet of electrostatically chargeable flexible polymeric material which is 1/16th of an inch or less thick, the material being adapted to sustain an electrostatic charge sufficient to support at least three ounces per square foot of said material against a vertical surface for at least one month.

The article of manufacture preferably includes flexible polymeric material having a thickness of from 1/64th to 1/32nd of an inch.

DESCRIPTION OF THE PREFERRED EMBODIMENTS

In the present invention, I have found that an intermediate, polymeric, electrostatically chargeable sheet may be affixed to the back of a relatively heavy object to be displayed, and the sheet charged sufficiently to adhere to the support surface for a period of months, on surfaces ranging from very smooth to very coarse.

The strength of the electrostatic adhesion depends upon:

(a) the electrical insulation properties of the intermediate sheet;
(b) the electrical insulation properties of the supporting surface;
(c) how the chargeable material is charged; and
(d) relative humidity and support surface dampness.

A suitable intermediate sheet is flexible plastic foam, which commonly is available in thicknesses between 1/64 and ½ inch. In the present invention, I have found that surprising improvements in holding power over the prior art are achieved using thicknesses of 1/16th of an inch or less. Such thin sheets are especially preferred since they are more flexible than thicker sheets, provide improved support at minimum cost and are less visible in use. It is especially preferred that the thickness of the intermediate sheet be from 1/64th to 1/32nd of an inch, since even greater holding power has been found with such thicknesses.

As mentioned, the present invention allows relatively heavy objects to be supported for extended periods of time. By "relatively heavy" it is meant that weights of as much as 13 ounces per square foot of intermediate sheet surface area can be supported for a few days or, alternatively less weight can be supported for longer than one year.

It should be noted that the amount of weight which can be supported may be traded off with the period of time an object is to be supported. Clearly a 13 ounce object will not remain adhered to a support surface for as long as a 4 ounce object, given the same intermediate material and method of charging. Thus, in the experiments detailed below, I have used constant weights while varying both the material used to charge the sheet, and separately, used varying thicknesses while using the same charging material, and reported the results by length of time the object was held to the support surface. As a standard, the results are reported by specifying the changes in the length of time a particular combination was supported. Using this system, it is clear that where the weight of an object is specified, along with a period of time, that the use of less weight can be expected to extend the holding period, while increasing the weight will decrease the amount of time the object can be expected to be supported.

The foams useful as the intermediate sheet material of the invention are readily available commercially as packing materials and the like and are inexpensive. The type of plastic is less important than the density and cell structure of the foam, since the density affects the length of time the display stays up before the charge bleeds off to a level insufficient to overcome the force of gravity. A tight cell structure retains charge longer than a porous one.

Polyethylene foam is inexpensive and readily available. Polystyrene foam serves equally well. Also foam sponges work well. A closed cell foam works best, and the lighter the density the longer the display and intermediate sheet remain standing. The foam is flexible, so displays adhered to it can be rolled up, and displays can be attached to somewhat irregular surfaces. Rigid foams do not work as well because they do not conform to the support surface as well as flexible foams. Small bubbles in the foam are preferred over large expanded polymer beads, apparently because smaller voids are present.

A suitable foam intermediate sheet is an expanded polyethylene sold under the trademark "Cushion-Foam" by Richter Company, 159 North San Antonio Avenue, Pomona, Calif. It comes in rolls up to 72 inches wide which may be easily cut to the desired size and shape.

The density of the foam should be between 0.0 and 1.0 ounces per square foot. I have found excellent results with a foam 1/32 of an inch in thickness, having a density 0.05 ounces per square foot.

The charge-inducing material used in the present invention is of critical importance, or perhaps, more accurately, it is the condition of such material which is key. For electrostatic charging, it is certainly known to use natural fibers, animal hair or fur, of the type commonly used to make pads (usually wool) or painter's roller covers and brushes. Artificial fibers may also be used.

What I have now found, however, is that the degree of charging provided by materials like animal hair or fur, or by hides, such as chamois, is greatly enhanced by carefully cleaning substantially all oils and fats from the fibers or hide.

In order to impart a charge, the charging material is passed over the intermediate sheet with sufficient strokes to have all areas of the intermediate sheet receiving at least ten strokes. Preferably, each area should receive 30 strokes to assure maximum charge. Beyond 30 strokes, little increase in the degree of adhesion is apparent with smooth surfaces. It has been found that rough textured walls may require as many as 50 strokes.

Lanolin is a fatty substance extracted from wool, used in ointments, cosmetics, etc. Wool contains fat. Polyethylene manufacturers frequently add animal fat to their formulas to prevent static build-up. I believe that those who have practiced static adhesion in the past have failed to recognize that a thoroughly cleaned and fat free wool or other material used as a buffing pad will enhance the ability of the fibers to shed their electrons and thereby increase the static in the material being brushed. Buffing materials like some animal skins have oil added to them and they are then called "chamois".

Top grade, and in some cases even lower grade, chamois was found to obtain better results with less effort than any fibrous type of buffing material. Without limiting the invention it is believed that the material is less cushioning than fur or other fibrous buffers and does not require as much pressure to fully contact the foam surface and give it a full charge. The denser, smoother surface of the chamois brings more electrons into contact with those of the foam. Also, chamois, like fiber buffers usually has all of the oils removed in processing, but unlike wool and other fibrous materials does not usually have oil or other chemicals added back to it. These chemicals and oils are added to fibers to increase luster, improve color, improve polishing, and particularly in the case of lower grade pelts to increase softness and resiliency.

The different wool and other fibrous buffers I tested contributed different degrees of static to the foam material. Considerable improvement was noted in some of the buffers tested after a thorough washing with detergent, to remove substantially all oil and fats, and in some cases the improvement was dramatic. Nevertheless, using chamois still provided better overall results, and with less effort.

Cashmere, alpaca, and mohair are finer than ordinary wool and these materials are especially useful for electrostatic charging. Different sheep produce varying grades of wool, some, such as merino, resemble cashmere. After making my own buffers from these finer grades of wool, I found considerably improved static charging. That is, where fur is being used, and where such fur is substantially oil and fat free, the best results are obtained where very fine fur is used. In addition to those already mentioned, squirrel fur is another suitable fur for charging.

The electrostatically chargeable foam material of the invention may be fixed to an object or display sheet, such as a poster, by any convenient means. For example, rubber cement, water-based adhesives, and oil-based adhesives are suitable to bond paper to plastic foam. It appears important in any case to thoroughly seal the foam backing to the object to be supported in order to prevent the charge from bleeding through. Three particularly convenient adhesives are those from 3M company under the "Scotch" trademark, designated Spray-Mount Artists Adhesive Cat. #6065, Art & Display Adhesive Cat. #6060, and Vac-U-Mount Adhesive Cat. #6069.

When the supported object or display sheet is coated or laminated with plastic, it may be bonded to the chargeable sheet merely by the application of heat, in the manner of heat-seal wrappers.

The display may be paper, as in posters, photographs, memoranda, or other indicia-bearing sheets. They may be cut to any configuration, such as children's animals or characters. Holiday displays, such as a Christmas or Halloween indicia, can be displayed as long as desired. They may be of felt, as in pennants, or virtually any plastic.

The charged display may, under certain circumstances, be slid along a support surface. A city street map, for example, may be moved up or down on the support surface to permit easy viewing by a reader. If such a map were pinned or taped, the reader would have to stoop or stand on something to focus on particular areas of the map. Likewise, large blueprints may be moved on the support surface to allow close viewing of areas of interest, without losing the charge.

Also, this ability to move the supported display gives rise to the possibility of using the invention as a child's game, wherein the object supported is shaped as, for example, a boat or a balloon, and weights are added to force the display to "sink".

The support surface to which the object or display and intermediate sheet are electrostatically adhered may be of any character usually found in buildings. Thus, sheet-rock, whether painted or covered by wallpaper is suitable. Plaster and stucco, even with a fairly rough texture, will support the displays of this invention. Wood and glass also may be used as the support surface. Even unpainted redwood boards and shingles will support the displays. Metal, such as an enamel refrigerator door, is a suitable support surface. Bricks and masonry may also be used as the support surface. The support surface need not be vertical. I have adhered displays according to the invention to ceilings for months at a time.

The invention will be further understood by reference to the following examples, which quantify the important features of the invention.

EXAMPLES

1. BACKING THICKNESS

Experiments were run using the same charging material (commercially available wool buffers which had been cleaned to remove contaminants such as oils) for all tests, as well as the same chargeable backing, but varying the thickness of the electrostatically chargeable backing sheet.

Six sheets of "VOLARA" type crosslinked polyethylene (the type used in U.S. Pat. No. 4,275,112 were laminated as indicated (i.e. object to backing), each of the chargeable sheets and the object supported being one square foot. In all cases, the laminate was placed on a sheetrock wall of average surface texture in a room subject to wide variations in temperature and humidity. Following the teachings of U.S. Pat. No. 4,275,112 the laminates were charged two days before being placed on the wall, and recharged just prior to being positioned on the wall.

| BACKING THICKNESS | OBJECT SUPPORTED | TIME HELD |
|---|---|---|
| 1. 1/16 in. | paper (0.5 oz.) | 62 days |
| 2. 1/16 in. | cardboard (3.5 oz.) | 38 days |
| 3. ⅛ in. | paper (0.5 oz.) | 40 days |
| 4. ⅛ in. | cardboard (3.5 oz.) | 10 days |
| 5. ¼ in. | paper (0.5 oz.) | 8 days |
| 6. ¼ in. | cardboard (3.5 oz) | 3 days |

Using non-crosslinked polyethylene, four additional experiments were undertaken, all sheets again being one square foot. For 1/16th inch foam backing laminated to paper, the display was held on a supporting wall for seven months. For the same thickness, the heavier cardboard display (3.5 ounces) was held three months. Repeating these runs for ⅛th inch material, however, it was found that the paper laminate was held only four months and the cardboard laminate only one month. Thus, the 1/16th inch backing held three to four times longer than the ⅛th, even when only a single charging was used.

To determine if even thinner sheets of electrostatically chargeable material would result in further improvements, two additional runs were undertaken. For these, a non-crosslinked polyethylene packaging foam one square foot in area was laminated to paper. It was found that for both 1/32 and 1/64 inch thicknesses extremely good adhesion occurred. These test have been positioned on a support wall for a year and are still holding.

These tests surprisingly show that thinner backing materials provide greater holding power where other conditions are held constant, and that significantly greater holding power is found for backing materials which are 1/16th inch thickness or less. More particularly, it highlights that weights of at least three ounces are supported for a period of at least three months, when backing of 1/16 of an inch or less is used.

In light of these tests, it is preferred to use backing material which is 1/16th of an inch or less in thickness, and especially preferred to use thicknesses of from 1/64 to 1/32nd of an inch.

2. CHARGING MATERIALS

In order to determine the effect of varying the type of charging material used, the following tests were run. Runs 1 to 6 of example 1 were rerun, however, for this test the laminates were charged using a wool buffer which had not been washed to remove substantially all oils and fats. The backing in each case was charged in the same manner as runs 1 to 6. In each case, it was found that the amount of time the laminate was held on the wall was between 25 and 50% less than the results shown in example 1.

In other tests it was found that the use of substantially oil and fat free charging materials substantially increased holding power as compared to when contaminated pads were used for charging. For example, the use of substantially oil and fat free fibrous charging materials, or non-fibrous, animal hide material such as chamois, resulted in improvements of as much three times the holding strength for some displays. Using such charging materials, I was able to use 1/32nd inch polyethylene backing (one square foot) to support a five ounce display for several months.

In an additional test, one square foot of cardboard was adhered to a backing of 1/16th inch thickness polyethylene foam and charged using an oil free painters lambskin roller cover. A cardboard shelf was then added to the display and a coffee mug weighing nine ounces was placed on the shelf. The total display and cup weighed 13 ounces, but remained supported on the wall without slipping for 79 hours.

One advantage of the stronger holding power of the present invention is that heavier, harder surface materials can be factory bonded to the chargeable foam and later printed thereon by customary printing methods.

While only certain materials useful in the invention have been disclosed herein, it is to be understood that many variations of the invention claimed below may be made without departing from the true spirit and scope thereof. All such variations are therefore intended to fall within the language of the appended claims, wherein

I claim:

1. In a method of adhering an object to a support surface, the improvement comprising adhering an electrostatically chargeable flexible intermediate polymeric sheet 1/16 of an inch or less in thickness to the back of said object, inducing an electrostatic charge on said sheet by rubbing said sheet with a buffing material selected from the group consisting of substantially oil and fat free hair, fur or hide to impart a charge sufficient to support at least three ounces per square foot of said chargeable sheet for at least three month without siding or falling, and pressing the display and intermediate sheet against the surface.

2. The method of claim 1 wherein the intermediate sheet has a thickness of from 1/32nd to 1/64th of an inch.

3. In a method of adhering an object to a support surface, the improvement comprising adhering an electrostatically chargeable flexible intermediate polymeric sheet of from 1/16th to 1/64th of an inch thickness to the back of said object, inducing an electrostatic charge on said sheet by rubbing said sheet with a buffing material selected from the group consisting of substantially oil and fat free hair, fur or hide to impart a charge sufficient to support at least three ounces per square foot of said chargeable sheet for at least three months.

4. The method of claim 3 wherein said sheet is from 1/32nd to 1/64th of an inch in thickness, and is charged with said buffing material to impart a charge sufficient to support at least three ounces per square foot of said sheet for at least one year.

* * * * *